United States Patent [19]
Fleming

[11] Patent Number: 5,277,828
[45] Date of Patent: Jan. 11, 1994

[54] STEAM REGENERABLE FILTER AND METHOD

[76] Inventor: Mark A. Fleming, 32 Lanark Ave., Toronto, Ontario, Canada

[21] Appl. No.: 872,096

[22] Filed: Apr. 21, 1992

[51] Int. Cl.⁵ .................. B01D 24/46; B01D 35/18; B01D 24/00
[52] U.S. Cl. .................. 210/792; 210/791; 210/134; 210/89; 210/175; 210/149; 210/295; 210/264; 210/261
[58] Field of Search ........... 210/791, 175, 264, 295, 210/110, 134, 142, 204, 437, 451, 792, 274, 673, 89, 149, 261

[56] References Cited

U.S. PATENT DOCUMENTS

| | | | |
|---|---|---|---|
| 103,320 | 5/1870 | Fleischmann | 210/274 |
| 309,222 | 12/1884 | Gray | 210/274 |
| 317,457 | 5/1885 | Hodgkin et al. | 210/274 |
| 384,538 | 6/1888 | Oliphant | 210/274 |
| 471,811 | 3/1892 | Deutsch | 210/274 |
| 553,641 | 1/1996 | Deutsch | 210/274 |
| 593,666 | 11/1897 | Sewell et al. | 210/274 |
| 668,441 | 2/1901 | Dyer | 210/274 |
| 897,745 | 9/1908 | Jager | 210/274 |
| 2,181,672 | 11/1939 | Sutcliffe et al. | 210/673 |
| 2,432,475 | 12/1947 | Griffith | 210/437 |
| 2,850,168 | 9/1958 | Nostrand | 210/295 |

FOREIGN PATENT DOCUMENTS

| | | | |
|---|---|---|---|
| 1051189 | 2/1989 | Japan | 210/175 |
| 2227998 | 8/1990 | United Kingdom | 210/264 |

Primary Examiner—Robert A. Dawson
Assistant Examiner—Ana M. Fortuna
Attorney, Agent, or Firm—Ladas & Parry

[57] ABSTRACT

A filter assembly for fluids such as air and water employs a cleanable filter. The filter is located within a housing having a reservoir, and a steam generator which can be selectively operated to clean the filter.

20 Claims, 5 Drawing Sheets

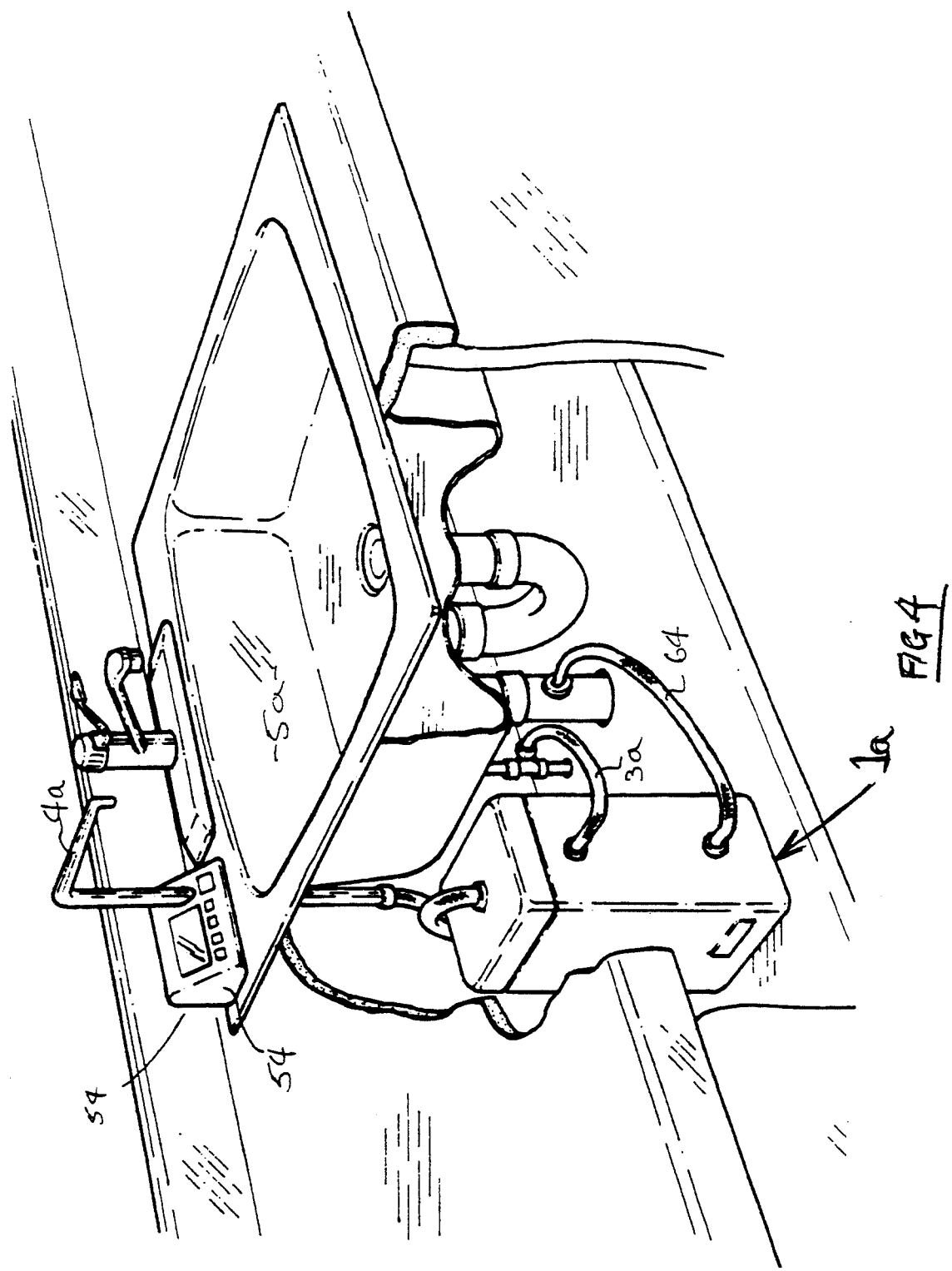

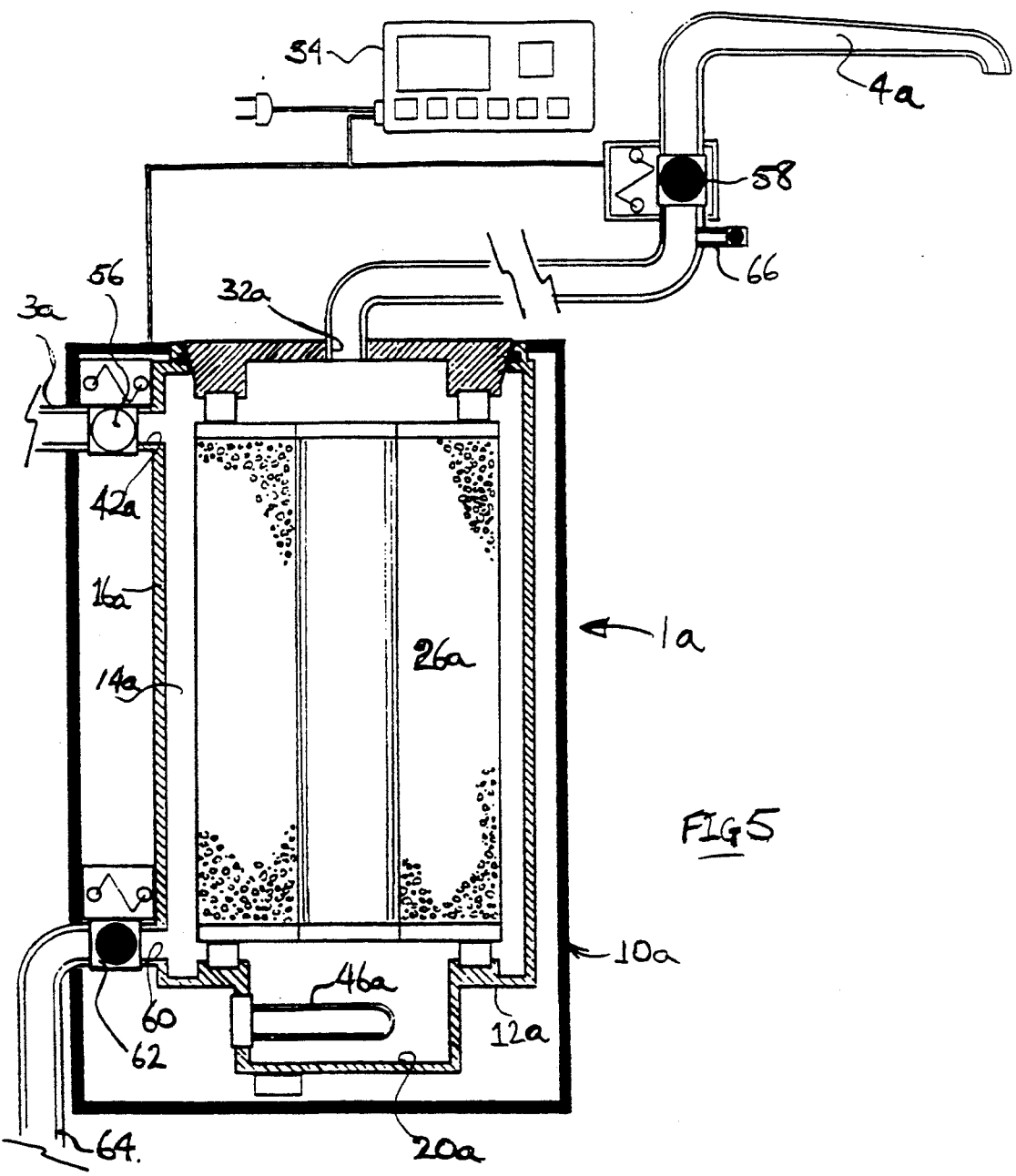

STEAM REGENERABLE FILTER AND METHOD

The invention relates to fluid filtration assemblies having a filtration media located within a housing.

Fluid filtration systems are known, using various chemical or particle media such as activated charcoal, sand, silica, catalysts and the like. When such systems are used to filter fluids such as drinking water, it is necessary to clean or replace the filtering medium periodically due to micro-organism and bacteria growth. Previously, reverse flushing of the water supply has been used for cleaning or the filter has been removed, cleaned and replaced.

Flushing in place with water does not inactivate bacteria or adequately remove foreign particles which have built up in the filter. The filtration capacity of the medium thus progressively diminishes and necessitates cleaning or replacement of the filter.

Steam has been used to clean commercial filtration devices by means of an external steam generator but off-site or external cleaning is costly and inconvenient.

The present invention seeks to overcome these disadvantages by providing a more convenient and efficient on-site regeneration of the filtration medium adaptable to a scale capable of domestic application.

In general terms, the present invention provides a filter assembly comprising:
a housing;
a cavity within the housing;
a fluid inlet port to permit flow into the cavity from a fluid supply;
a fluid outlet port to permit flow out from the cavity to a dispenser;
a filter element located in the cavity and interposed between the inlet port and outlet port so that fluid passes through the filter element in going between the inlet port and the outlet port;
a drain to allow drainage of the cavity and to maintain fluid in the reservoir;
a reservoir in fluid communication with the cavity and operable to retain fluid within the reservoir upon drainage of the cavity; and
selectively operable heating means associated with the reservoir and operable to vapourize fluid in the reservoir and to direct vaporized fluid through the filter element to effect cleaning thereof;

Accordingly, the filtration element and the steam generator may be placed in a single housing for economy and ease of installation. The steam regenerated filter is rendered sterile and therefore has a longer life than currently available filters which must be replaced or removed for cleaning.

In a preferred embodiment of the invention, adaptable for use as a domestic water filter, the filter assembly is contained within a housing which can be placed on a countertop near a sink or under a counter and can also be plumbed and wired into the household water supply and electrical supply for automatic operation.

Embodiments of the invention will now be described by way of example only, with reference to the accompanying drawings, in which FIG. 1 is a perspective view of a manually operated filter unit installed in a household sink;

FIG. 4 is a view similar to FIG. 1 showing the installation of a second, automated embodiment of a filter unit; and FIG. 5 is a partial sectional view of the automated assembly shown in FIG. 4.

Figure 1:
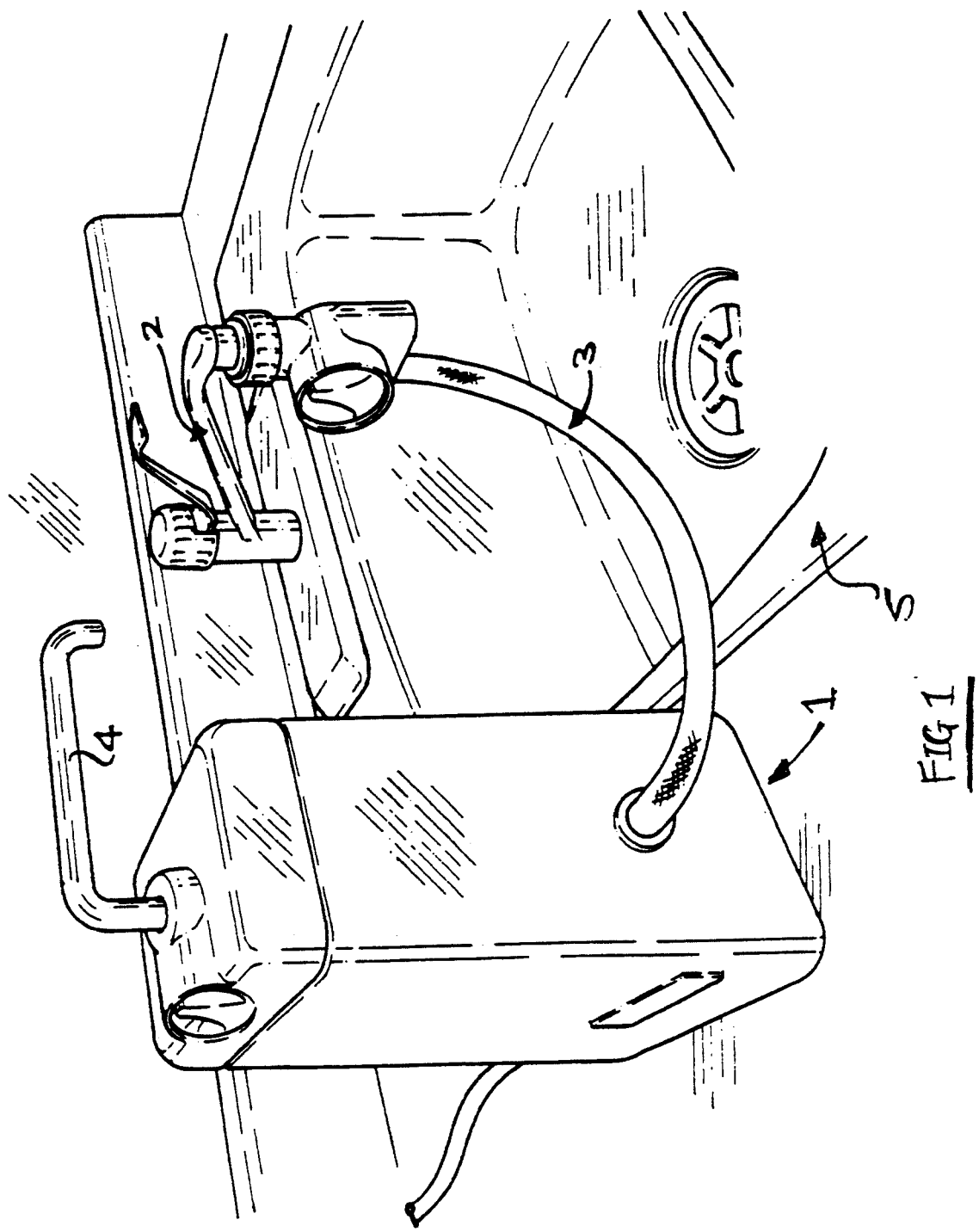

Referring to the drawings, a filter unit 1 is connected to a domestic water supply 2 by a hose assembly 3. The filter 1 dispenses filtered fluid through a spout 4. As illustrated in FIG. 1, the filter 1 is arranged to sit on a countertop in a kitchen adjacent to a sink indicated at 5.

Figure 2:
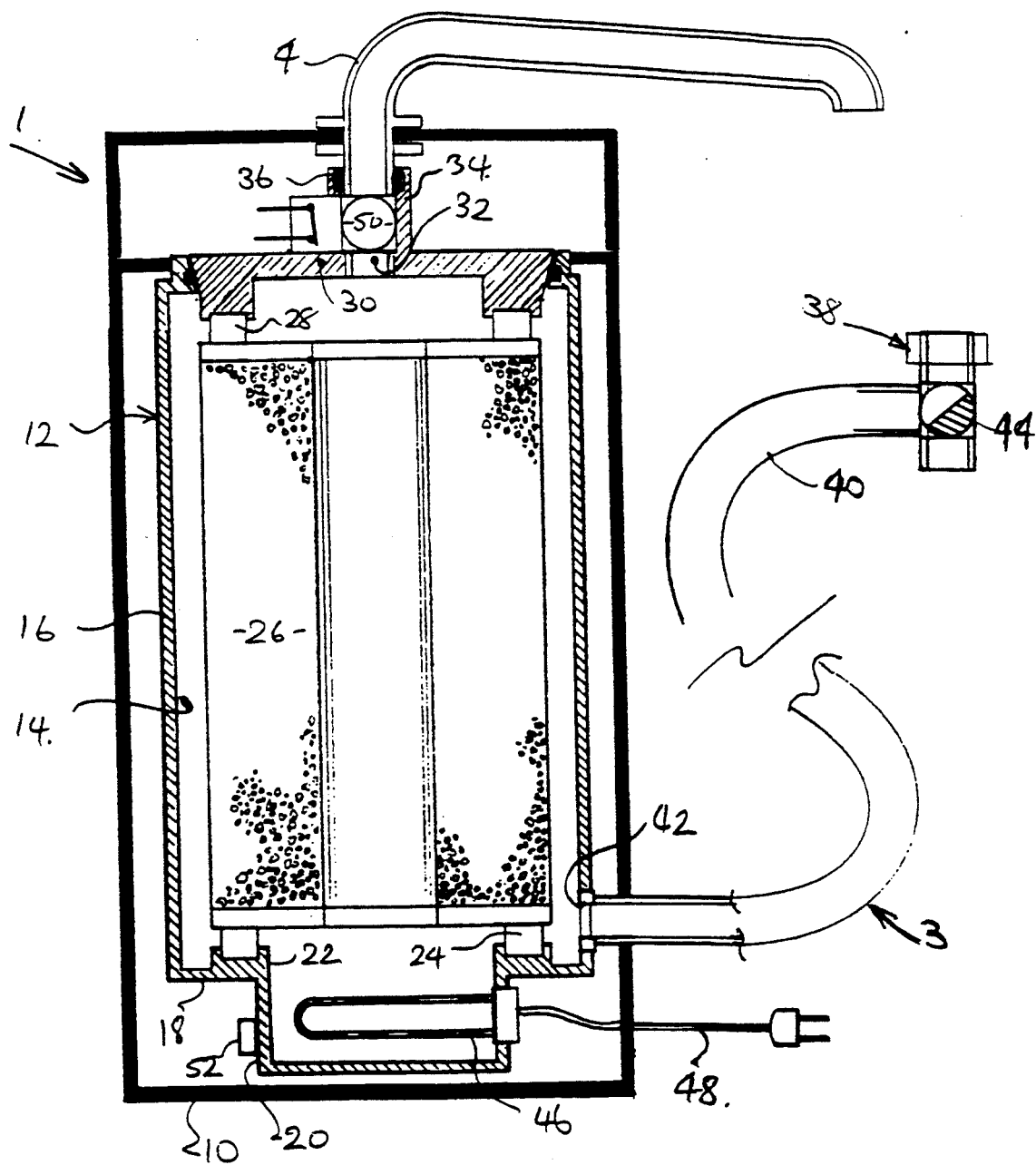
FIG. 2 is a sectional view of the manually operated filter unit when in service for dispensing filtered fluid.

As can best be seen in FIG. 2, the filter unit 1 includes an external casing 10 and an internal housing 12. The housing 12 includes a generally cylindrical wall 16 and a radially extending end wall 18 to define an internal cavity 14. The end wall 18 extends between the cylindrical wall 16 and a reservoir 20 is formed in the end wall 18.

An annular shoulder 22 is formed on the end wall 18 to accommodate a sealing ring 24 on which a filter element 26 is mounted. The filter element 26 is sealed within the housing 12 by a second sealing ring 28 located between a cap 30 and the filter element 26. The cap 30 is secured to the upper end of the cylindrical wall 16 by screw threads so as to be removable and allow replacement of the filter element 26. Cap 30 has a central bore 32 extending into a boss 34. The inner end of the spout assembly 4 is received within the bore 32 in the boss 34 and sealed by O rings 36 to permit it to swivel about a generally vertical axis.

The hose assembly 3 includes a quick connect fitting 38 for attachment to the water supply indicated at 1 and a hose 40 that extends from the fitting 38 to an inlet port 42 in the cylindrical wall 16. The fitting 38 includes a diverter valve 44 which can direct fluid either into the hose 40 or directly through the fitting 38 into the sink 5. The filter element 26 provides an annular partition within the cavity 14 so that water flowing from inlet port 42 to the outlet port 32 must pass through the filter element 26. The filter element 26 contains a filtration medium, preferably activated charcoal but suitably any medium known to have filtration properties such as activated carbon, sand, clay, silica, fused alumina, garnet, zircon, ilmenite, activated silica, free carbon, zeolite or ceramics. In the embodiment illustrated, the filtration medium should be capable of cleaning and sterilization through the action of steam.

A heating element 46 is located within the reservoir 20 is supplied with and electrical power through an electrical cord 48. A thermostat 52 mounted on the wall of the reservoir 20 regulates the electrical power to the heating element 46. It will be noted that the inlet port 42 is disposed above the reservoir 20 and within the radially inner portion of the cavity 14.

The boss 34 also includes a check valve provided by a ball 50 which will seat against the upper edge of the outlet bore 32 under the influence of gravity. However, the application of fluid pressure will lift the ball 50 and allow flow through the spout 4.

Figure 3:
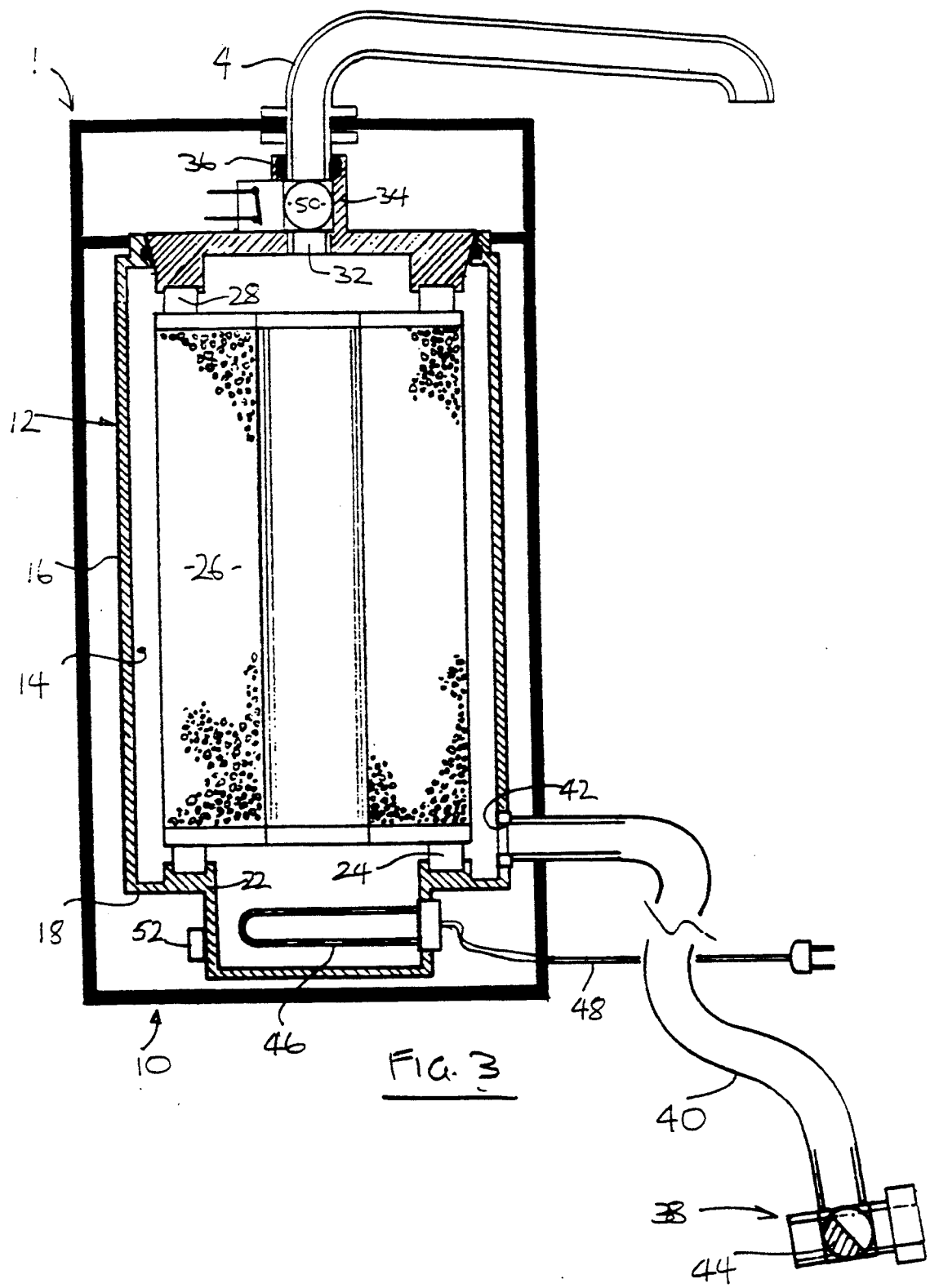
FIG. 3 is a sectional view of the manually operated assembly during cleaning.

In normal operation, the diverter valve 44 is set to direct fluid through the hose 40 and into the filter unit 1. The fluid flows through the inlet port 42, through the filter medium 26 to lift the ball 50 and allow filtered fluid to be dispensed through the spout 4. Because of the disposition of the inlet port 42 above the reservoir 20, the reservoir 20 will be filled with fluid as it passes through the medium. After a predetermined interval, it will be necessary or desirable to sterilize and clean the filter element 26. To accomplish this, the fitting 38 is removed from the supply 2 and, as shown in FIG. 3, moved to a position below the level of the casing 1. In this position, water will drain out of the cavity 14 until the water is below the level of the outlet port 42. At that time, water will still remain within the reservoir 20. The heater element 46 is then activated by electrical power so that the water within the reservoir 20 is heated and eventually boils. The boiling of the water within the reservoir 20 generates steam within the cavity 14 which is effective to clean the filter element 26. The ball 50 is effective to prevent steam escaping through the spout 4 so that the steam is forced through the filter element and out of the port 42 to issue through the hose assembly 3. The water will continue to boil until the external sensor 52 identifies a lack of water within the reservoir 20 and prevents the application of further power to the heating element 46. After this, it is assumed that the filter element 26 has been cleaned and sterilized and thereafter the hose assembly 3 can again be connected to the faucet 5, the filter element 26 flushed and the filter unit returned to normal service.

If necessary, the ball 50 can be seated by means of a light spring sufficient to inhibit passage of steam under normal operation but which will also vent the interior of the casing in the event that for some reason the hose assembly 3 or the filter element 26 is blocked. As a further preference, the ball 50 can be operated by a solenoid to facilitate venting of the interior of the casing 14 during drainage of fluid prior to cleaning.

It will be seen, therefore, that the filter assembly shown in FIGS. 2 and 3 provides a simple yet effective cleanable water filter and that the disposition of the reservoir 20 below the inlet port 42 ensures that water is available for sterilizing without requiring all of the water within the casing to be heated to boiling point.

A further embodiment is shown in FIGS. 3 through 7 with like components indicated with like reference numerals with a suffix "a" added for clarity. The filter unit 1a shown in FIGS. 3 through 7 is intended for permanent installation beneath the countertop 3a and as such its filtering and cleaning cycle is controlled automatically from a controller 54. As can be seen from FIGS. 4 and 5, the filter assembly 1a includes a casing 10a and an internal housing 12a containing filter element 26a. Fluid is supplied through a supply duct 3a to an inlet port 42a with the supply duct 3a permanently connected to the normal domestic cold water supply. Flow through the duct 3a is controlled by a solenoid-operated valve 56 that is operable in either open or closed conditions to allow or prohibit flow through the duct 3a. It will be noted that the inlet port 42 is located at the upper end of the cylindrical wall 16a but is still disposed above the reservoir 20a.

Outlet port 32a also includes a solenoid-operated control valve 58 similar to valve 56 so that flow through the outlet port 32a can be controlled by valve 58.

The housing 12a is also supplied with a drain port 60 disposed at the lower end of the cylindrical wall 16a and having a solenoid-operated control valve 62 controlling flow through the port 60 into a drain duct 64.

The condition of the valves 56, 58, 62 is controlled from a central controller 54 which includes a timer to operate according to a predefined cycle over an extended period. In normal operation, the controller 54 maintains the valve 56 open so that fluid is supplied to the interior cavity 14a and maintains the reservoir 20a full. When filtered water is required, a button on the control 54 is pressed and the valve 58 opened. Fluid then flows from the inlet port 42a through the filter element 26a and out of the spout 4a. Once the control button is released, the valve 58 returns to a closed condition and further flow is prohibited.

After a predefined period, the controller 54 determines that it is appropriate to sterilize and clean the filter element 26a. At this time, the controller 54 closes the valve 56 and opens valve 62. The cavity 14a is thus drained through the drain duct 64 leaving fluid in the reservoir 20a. The controller 54 then closes valve 58 and activates the heating element 46a to boil fluid in the reservoir 20a and sterilize the filter element 26a as before. It will be noted that a pressure relief valve 66 is provided adjacent the control valve 58 to allow venting of the cavity 14a in the event that the filter element is blocked or undue pressure from the steam is generated.

After the water has boiled off, the thermostat 52a signals the controller 54 to terminate heating, close the drain valve 62 and open the inlet valve 56. The controller 54 may also open valve 58 for a short period to refill the cavity 14a and flush the filter element 26a.

Thus, cleaning and sterilizing of the filter element 26 may again be accomplished in a simple yet effective manner without removal of the filter element, thereby prolonging the life of the element.

In the above embodiments, the reservoir has been located below the outlet port 20 which renders the formation of the reservoir simple yet effective. It will also be appreciated of course that the reservoir can be located at other locations within the housing 12 such that supply of fluid to the filter will fill the reservoir. Drainage of fluid from the reservoir can be inhibited by a weir or other devices when fluid is drained from within the housing. Likewise, it is preferred that the reservoir is located within the inner portion of the cavity so that filtered fluid is provided in the reservoir. However, it could be located on the opposite side of the filter element to the outlet port and in this case, the flow through the inlet port would be prevented while steam was being generated, thereby ensuring that steam is forced through the filter element to effect cleaning. Of course, it is preferred that the steam contraflows through the filter element to assist in removing any physical blockage of the filter element that may have occurred.

We claim:

1. A filter assembly comprising:
   a housing;
   a cavity within the housing;
   a fluid inlet port to permit flow into the cavity from a fluid supply;
   a fluid outlet port to permit flow out from the cavity to a dispenser;
   a filter element located in the cavity and interposed between the inlet port and outlet port so that fluid passes through the filter element in going between the inlet port and the outlet port;
   a drain means selectively operable to allow drainage of the cavity;
   a reservoir in said cavity, operable to retain fluid within the reservoir upon drainage of the cavity by said drain means; and
   selectively operable heating means associated with the reservoir, operable to vaporize fluid in said reservoir and to direct vaporized fluid through the filter element to effect cleaning thereof.

2. The assembly claimed in claim 1 wherein one of said inlet port and said outlet port is connectable to said drain means.

3. The assembly claimed in claim 2 wherein said one port is said inlet port.

4. The assembly claimed in claim 2 wherein said drain includes a flexible conduit, one end of which is connected to said one port and the other end of which may be positioned below said port for drainage.

5. The assembly claimed in claim 1 wherein said drain means is a flexible conduit which may be moved to a position lower than the cavity to permit drainage of fluid from the cavity.

6. The assembly claimed in claim 5 wherein the flexible conduit is connected to one of said inlet port and said outlet port.

7. The assembly claimed in claim 6 wherein said one port is located at a lower portion of said cavity.

8. The assembly claimed in claim 1 wherein said reservoir is located below said one port.

9. The assembly claimed in claim 5 wherein said flexible conduit includes a valve to control flow through said filter element, said valve being movable between a first position wherein fluid flows from a fluid supply to said cavity, and a second position wherein fluid is prevented from flowing from a fluid supply into the cavity, said first position of said valve permitting fluid to drain from said cavity upon said distal end of said conduit being positioned below said cavity.

10. The assembly claimed in claim 1 wherein one port serves as both said fluid inlet port and said drain.

11. The assembly a claimed in claim 1 wherein at least one of said inlet port and said outlet port includes a valve operable to inhibit flow of fluid therethrough upon generation of steam by said heating means.

12. The assembly as claimed in claim 11 wherein said drain means are separated from said inlet and outlet ports and each of said ports includes a valve to inhibit flow therethrough upon generation of steam by said heating means.

13. The assembly as claimed in claim 12 wherein said drain means include a drain valve to maintain said drain means closed when fluid is passing from said inlet to said outlet.

14. The assembly claimed in claim 13 wherein a pressure relief valve is provided to vent said cavity.

15. The assembly claimed in claim 12 wherein an electric timer initiates the steam cleaning after a predetermined period.

16. The assembly claimed in claim 15 wherein said electronic timer is pre-programmed to initiate the following steps:
   i) close the valve associated with said inlet port;
   ii) open the valve associated with said drain and said outlet to allow the filter element to drain by gravity;
   iii) close the valve associated with said outlet;
   iv) switch the heating means on to boil the contents of the reservoir;
   v) allow vaporized fluid to be vented through the draining means;
   vi) shut the heating means off by means of the thermostat when no fluid remains in the reservoir; and
   vii) close the draining means and open the valve associated with said inlet port so that filtered fluid is available from said outlet.

17. The assembly claimed in claim 1 wherein the filter element contains a filtration medium comprising one or more substances selected from the group consisting of activated carbon, sand, charcoal, clay, silica, fused alumina, garnet, zircon, ilmenite, activated silica, free carbon and zeolite.

18. The assembly claimed in claim 1 wherein the heating means is thermostatically controlled.

19. The assembly claimed in claim 1 wherein the housing has a threaded lid to allow the enclosed filter element to be inserted and changed.

20. A method for the in situ cleaning and sterilization of a filter for fluids, said method comprising the following steps:
   providing within a housing, having an inlet and an outlet, a filter element, a fluid reservoir and a selectively operable heating means capable of vaporizing fluid within said reservoir and directing vaporized fluid through the filter
   ii) draining the content of the filter element;
   iii) vaporizing the content of the reservoir;
   iv) passing the vaporized content through the filter element; and
   v) draining the vaporized fluid from the housing, leaving the filter element clean for a next filtration cycle.

* * * * *